(12) United States Patent
Müller et al.

(10) Patent No.: US 10,583,806 B2
(45) Date of Patent: Mar. 10, 2020

(54) METHOD FOR OPERATING AN ANTI-THEFT DEVICE, ANTI-THEFT DEVICE FOR A MOTOR VEHICLE, AND MOTOR VEHICLE

(71) Applicant: AUDI AG, Ingolstadt (DE)

(72) Inventors: Frank Müller, Feucht (DE); Tobias Geier, Dachau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/323,585

(22) PCT Filed: Jun. 12, 2017

(86) PCT No.: PCT/EP2017/064287
§ 371 (c)(1),
(2) Date: Mar. 14, 2019

(87) PCT Pub. No.: WO2018/028857
PCT Pub. Date: Feb. 15, 2018

(65) Prior Publication Data
US 2019/0344755 A1    Nov. 14, 2019

(30) Foreign Application Priority Data

Aug. 8, 2016 (DE) .................. 10 2016 214 687

(51) Int. Cl.
*B60R 25/102* (2013.01)
*B60R 25/24* (2013.01)
(Continued)

(52) U.S. Cl.
CPC .......... *B60R 25/102* (2013.01); *B60R 25/209* (2013.01); *B60R 25/24* (2013.01);
(Continued)

(58) Field of Classification Search
CPC ........ B60R 2325/103; B60R 2325/205; B60R 25/04; B60R 25/102; B60R 25/209;
(Continued)

(56) References Cited

U.S. PATENT DOCUMENTS

2005/0273219 A1* 12/2005 Kitao ................ B60R 25/00
701/2
2006/0293802 A1* 12/2006 Kitao ................ B60R 25/00
701/2
(Continued)

FOREIGN PATENT DOCUMENTS

| CN | 101211475 A | 7/2008 |
| CN | 101462532 A | 6/2009 |

(Continued)

OTHER PUBLICATIONS

Examination Report dated Mar. 3, 2017 of corresponding German application No. 10 2016 214 687.4; 24 pages.
(Continued)

*Primary Examiner* — Orlando Bousono
(74) *Attorney, Agent, or Firm* — Maier & Maier, PLLC

(57) ABSTRACT

A method for operating an anti-theft device for a motor vehicle which is unlocked when a radio signal is received from a radio-based remote control device of the motor vehicle and, after unlocking, is started by actuating a start/stop operating element. Here, an interior of the motor vehicle is monitored by a detection device of the anti-theft device after the motor vehicle has been started. For the monitoring of the interior of the motor vehicle, a search signal restricted to the interior is output by the detection device in the interior of the motor vehicle. The radio-based remote control device is configured to output a detection signal when the search signal is received. If the detection signal is not received by the detection device before a
(Continued)

predetermined search time, a warning message is output to a unit outside the vehicle.

6 Claims, 1 Drawing Sheet

(51) Int. Cl.
  *B60R 25/20* (2013.01)
  *B60R 25/30* (2013.01)
  *B60R 25/10* (2013.01)
(52) U.S. Cl.
  CPC ...... *B60R 25/30* (2013.01); *B60R 2025/1016* (2013.01); *B60R 2325/103* (2013.01)
(58) Field of Classification Search
  CPC ......... B60R 25/24; B60R 25/30; B60R 25/33; G07C 5/008
  See application file for complete search history.

(56) References Cited

U.S. PATENT DOCUMENTS

| | | | |
|---|---|---|---|
| 2007/0057781 A1* | 3/2007 | Breed | B60K 35/00 340/457.1 |
| 2007/0109093 A1* | 5/2007 | Matsubara | G07C 9/00309 340/5.61 |
| 2007/0162191 A1* | 7/2007 | Matsubara | G07C 9/00309 701/1 |
| 2008/0157919 A1 | 7/2008 | Sugiura et al. | |
| 2009/0160639 A1 | 6/2009 | Chu | |
| 2010/0217457 A1* | 8/2010 | Georgi | B60R 25/245 701/2 |
| 2011/0080274 A1* | 4/2011 | Reed | B60K 28/066 340/425.5 |
| 2012/0126967 A1* | 5/2012 | McCormick | B60C 23/0408 340/445 |
| 2012/0253553 A1 | 10/2012 | Nagata | |
| 2013/0271273 A1* | 10/2013 | Oesterling | G07C 9/00309 340/426.18 |
| 2014/0148997 A1* | 5/2014 | Aaron | G07B 15/00 701/36 |
| 2014/0152422 A1* | 6/2014 | Breed | G06K 9/00369 340/5.52 |
| 2017/0138112 A1* | 5/2017 | Makke | B60R 1/00 |
| 2018/0178758 A1* | 6/2018 | Yamaguchi | B60R 25/24 |

FOREIGN PATENT DOCUMENTS

| | | |
|---|---|---|
| CN | 102729926 A | 10/2012 |
| DE | 102004052787 A1 | 5/2006 |
| DE | 102007033232 A1 | 1/2009 |
| DE | 102008057602 A1 | 5/2009 |
| DE | 102010004756 A1 | 7/2011 |
| DE | 102012015796 A1 | 2/2014 |
| DE | 102014114823 A1 | 4/2015 |
| DE | 102013020333 A1 | 6/2015 |
| DE | 102015015050 A1 | 5/2016 |
| EP | 2072354 A1 | 6/2009 |
| FR | 2768676 A1 | 3/1999 |
| FR | 2884787 A1 | 10/2006 |
| FR | 3003830 A1 | 10/2014 |
| JP | 2000272475 A | 10/2000 |
| WO | 2007084096 A2 | 7/2007 |
| WO | 2012049693 A1 | 4/2012 |
| WO | 2013072471 A1 | 5/2013 |

OTHER PUBLICATIONS

International Search Report and Written Opinion of the International Search Authority dated Aug. 30, 2017 in corresponding International application No. PCT/EP2017/064287; 39 pages including English-language Translation Attached.

International Preliminary Report on Patentability dated Nov. 7, 2018 in corresponding International application No. PCT/EP2017/064287; 51 pages including English-language Translation Attached.

International Preliminary Report on Patentability (Chapter II) dated Feb. 14, 2019, of corresponding International application No. PCT/EP2017/064287; 6 pages.

Office Action dated Jul. 15, 2019, in corresponding Chinese Application No. 201780049019.7 including partial machine-generated English language translation; 6 pages.

* cited by examiner

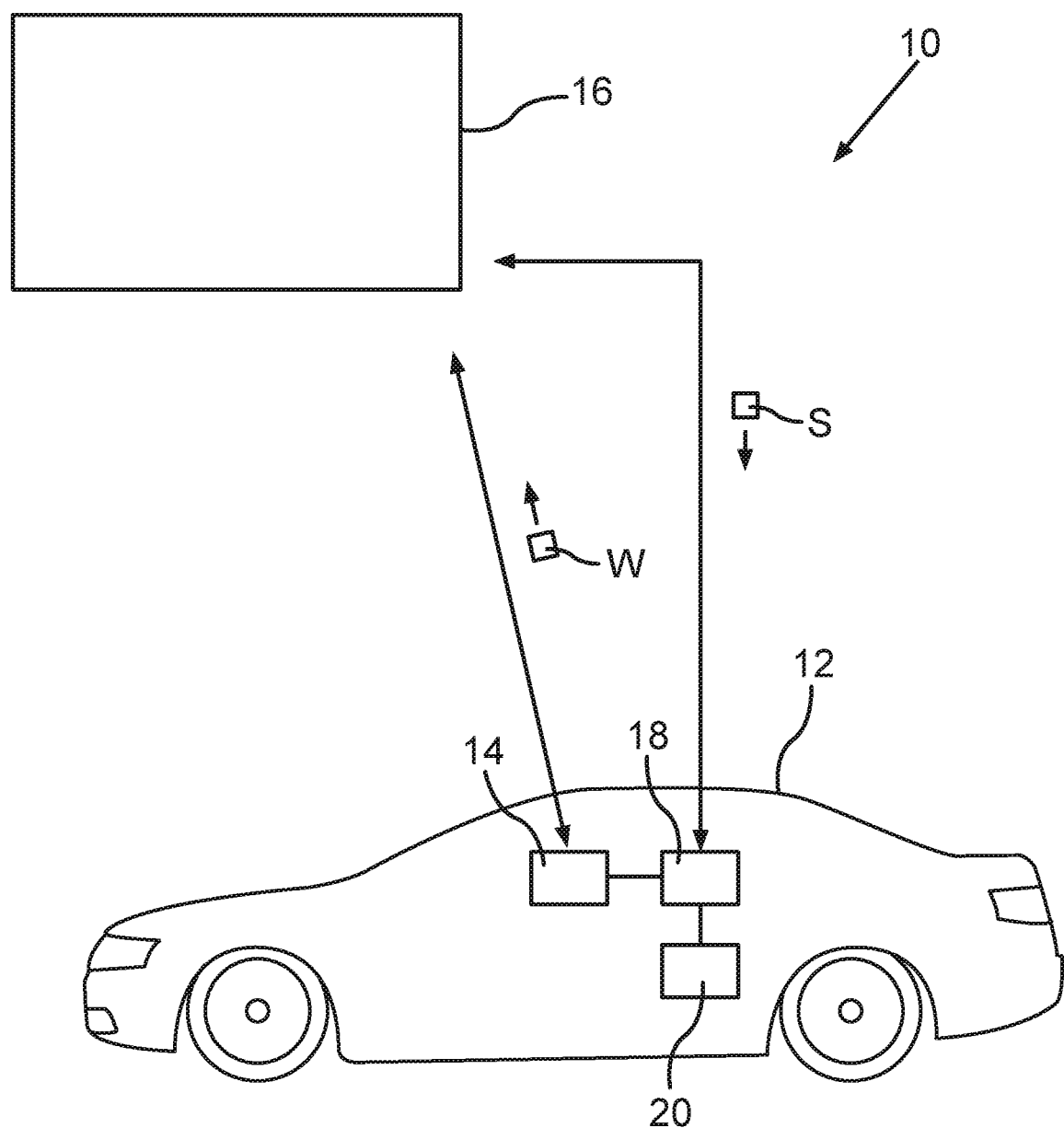

METHOD FOR OPERATING AN ANTI-THEFT DEVICE, ANTI-THEFT DEVICE FOR A MOTOR VEHICLE, AND MOTOR VEHICLE

FIELD

The invention relates to a method for operating an anti-theft device for a motor vehicle. The invention also relates to an anti-theft device which can be operated according to the inventive method. Finally, the invention also comprises a motor vehicle with the inventive anti-theft device.

BACKGROUND

From the general prior art, keyless unlocking and start systems for motor vehicles are known. In such systems, a user of the motor vehicle only needs to carry a radio key of the motor vehicle in order to gain access to the motor vehicle without actively using the radio key. For the unlocking of the motor vehicle, the user with the radio key must be located in the immediate vicinity of the motor vehicle, so that the radio key can communicate via radio signal with the motor vehicle in order to unlock the motor vehicle. The transmission path is thus limited to a predetermined distance from the vehicle.

Such unlocking and start systems which are not actively controlled by a user can be manipulated by third parties. For example, a third party can gain access to the motor vehicle by lengthening the transmission path of the radio key, for example, by means of antennas. Once the motor vehicle has been unlocked and started, theft of the motor vehicle can no longer be prevented.

In order to take measures against the theft of the motor vehicle, various approaches are known from the prior art.

Such approaches include, for example, DE 10 2010 004 756 A1, which proposes a method for reporting a theft and/or unauthorized movement of a parked vehicle. For this purpose, in the vehicle to be monitored, a receiving device is provided, which, after the locking of the motor vehicle, determines the position of the vehicle and stores the coordinates of the position in the memory device. Subsequently, the receiving device carries out a determination of the position of the vehicle at regular time intervals and compares the actual position with the position stored in the memory device. If the actual position differs from the stored position, then a message is sent to a fixed site by means of a transmission device.

Described in DE 10 2012 015 796 A1 is an engine immobilizer for a motor vehicle with a movement sensor and with an electronics unit for evaluating the movement detected by the movement sensor for the detection of a theft. In the case of a theft, the electronics unit stops the engine management and/or triggers an alarm.

Anti-theft methods or devices which carry out a position determination or detect a movement of the motor vehicle are particularly complex. The evaluation of the position or movement of the motor vehicle is particularly time consuming, as a result of which it is only possible to react with a considerable time delay to a presumed theft of the motor vehicle.

SUMMARY

In order to effectively prevent any unauthorized movement of the vehicle in the first place, a preventive measure is described in DE 10 2004 052 787 A1. This measure comprises an anti-theft method and device for a vehicle. Here encrypted data is exchanged between an authentication unit and a key element of the motor vehicle. On the basis of authentication data stored in a memory of the key element and in a memory of the authentication unit, the authentication unit verifies whether the key element is a key element associated with the authentication unit and thus a key element associated with the vehicle. If this is not the case, a driver cannot start the vehicle. Such a preventive measure is particularly complex due to the authentication process and of complex design.

The aim of the present invention therefore is to detect a theft and to initiate countermeasures particularly quickly and in a particularly simple and reliable manner and to initiate countermeasures.

This aim is achieved by a method for operating an anti-theft device for a motor vehicle and by an anti-theft device for a motor vehicle having the features of the independent claims. Advantageous designs with appropriate and non-trivial developments of the invention are indicated in the dependent claims.

In the inventive method for operating an anti-theft device for a motor vehicle, an interior of the motor vehicle is monitored by means of a detection device of the anti-theft device after the motor vehicle has been started. The motor vehicle is unlocked here upon receipt of a radio signal of a radio-based remote control device of the motor vehicle and is started after the unlocking by actuation of a start/stop operating element. Preferably, the motor vehicle has been unlocked and started without a use of a mechanical key, that is in a keyless manner. The user of the motor vehicle thus has not actively unlocked the motor vehicle by means of the mechanical key and turned the key in an ignition. The motor vehicle can thus preferably comprise a keyless function for unlocking the door or doors of the motor vehicle and for starting the motor vehicle. In the keyless function, the radio-based operating device can communicate via radio signals with the motor vehicle. Here, an authentication process preferably occurs. In the case of a successful authentication, an unlocking and a starting of the motor vehicle can be authorized. The radio-based remote control device can be a radio key of the motor vehicle, for example, or a portable mobile terminal such as a Smartphone, for example.

In order to monitor the interior of the motor vehicle, a search signal restricted to the interior is output by means of the detection device to the radio-based remote control device in the interior of the motor vehicle. In other words, for the tuning of the interior of the motor vehicle, a search signal tuned to the interior can be sent out to the radio-based remote control device. For the search signal to be restricted to the interior of the motor vehicle, the detection device can be configured to transmit the search signal at a predetermined transmission angle and/or with a predetermined signal strength. The radio-based remote control device is here configured to output a detection signal when the search signal is received. For transmitting and receiving a radio signal, that is to say the search signal and the detection signal, the radio-based remote control device can comprise a transmitting and receiving unit. Particularly preferably, the radio-based remote control device communicates by means of the detection device by near-field communication. Near-field communication should preferably be understood to mean a communication in a predetermined area in or around the motor vehicle. In the near-field communication, the radio-based remote control device can be configured to receive the search signal in the low-frequency radio range (LF radio range) and to transmit a radio signal in the high frequency radio range (HF radio range). Alternatively or additionally, in the near-field communication, the radio-based remote control device can be configured to communicate by near-field communication. Alternatively or additionally, the radio-based remote control device can also be configured to communicate via Bluetooth.

If no signal is received by means of the detection device before a predetermined search time, a warning message is sent to a unit outside the vehicle. The search time starts, for example, as soon as the detection device has output the search signal. The search time can be a predetermined time interval in a range from 0.5 seconds to 120 seconds, 10 seconds, for example.

This results in the advantage that an unauthorized movement of the motor vehicle, that is to say a theft of the motor vehicle, can be detected and communicated to the outside in a particularly simple and reliable manner. By transmitting a warning message to a unit outside the vehicle, anti-theft measures can be taken particularly quickly and reliably.

The invention also relates to optional developments whose features provide additional advantages.

According to an embodiment, after reception of the warning message, the unit outside the vehicle outputs a control signal to the motor vehicle, wherein a driving operation of the started motor vehicle is controlled by means of the control signal. For example, a control device of the motor vehicle can be configured to receive the control signal. After reception of the control signal, the control device can preferably be configured to reduce a speed of the motor vehicle or to stop the motor vehicle or to set a steering angle of a steering wheel of the motor vehicle as driving operation. As a result of the setting of the steering wheel angle, the motor vehicle can be steered in a predetermined direction. By reducing the speed or as a result of stopping the motor vehicle, time can be procured until further measures are initiated. Due to the external intervention of the unit outside the motor vehicle, a theft of the motor vehicle can be stopped.

After the reception of the warning message, the unit outside the vehicle advantageously additionally detects a position of the motor vehicle. As a function of the position of the motor vehicle, the unit outside the vehicle can then output the control signal. The determination of the position of the motor vehicle can preferably occur by means of a tracking system such as a GPS tracker, for example. For example, if, after reception of the warning message, the motor vehicle is to be stopped, that is if it is to be brought to a standstill, then it is possible to ensure by the position detection that the motor vehicle can only be stopped at places or sites that are authorized or safe in terms of traffic, without endangering other traffic participants. Thereby, the reliability of the anti-theft device can be increased.

An advantageous development provides that, after reception of the warning message, a unidirectional or bidirectional voice connection is set up between the unit outside the vehicle and the motor vehicle. In the case of a unidirectional voice connection, for example, only the unit outside the vehicle can communicate with the motor vehicle. Here, a user of the motor vehicle who is located in the interior cannot communicate or speak with the unit outside the vehicle. In the case of a bidirectional voice communication, the two parties, that is to say the unit outside the vehicle and the user in the motor vehicle can communicate with one another via the speech connection. For example, if the unit outside the vehicle is an operations center or police station, then, in the case of a unidirectional voice connection, the center or station can request the user or driver of the motor vehicle to stop the motor vehicle. If the driver of the motor vehicle does not react, further measures can be initiated by the operations center or police station. In the case of a bidirectional voice connection, the operations center or the police station can communicate with the driver of the motor vehicle, for example, in order to find out the reason for the unauthorized movement of the motor vehicle. By means of the voice connection, the reliability of the anti-theft device can be increased. Furthermore, by means of the unit outside the vehicle, a determination can be made as to which countermeasures are reasonable.

Advantageously, the detection device outputs the warning message to a mobile radio number of a portable mobile terminal, which is stored in the detection device. For example, the mobile radio number can be the mobile radio number of the portable mobile terminal of an owner of the motor vehicle. As warning message, a short message (SMS) or a voice message can be sent out, which informs the owner of the motor vehicle that the motor vehicle has been moved without authorization. Additionally or alternatively, the warning message can also transmit a current position of the motor vehicle. Thereby, the owner can be informed particularly quickly and reliably of a theft of the motor vehicle. If the warning message is sent out, for example, to the service center of the manufacturer, then the service center can take further measures. As further measures, for example, the service center can notify the owner about the theft.

An advantageous development provides that the unit outside the vehicle comprises an operations center and/or a service center of a manufacturer of the motor vehicle, to which the warning message is output. The operations center can be, for example, a traffic control office or a police station. The output of the warning message to the operations center can occur, for example, via an eCall system (Emergency Call System) of the motor vehicle. The service center can be, for example, a call center of the manufacturer. The warning message can be transmitted or sent out to the service center, for example, by means of a connect service of the manufacturer such as Audi Connect, for example.

Another advantageous embodiment provides that, in addition to the output of the warning message to the unit outside the vehicle, a notification signal is output via an output unit which is arranged in the interior of the motor vehicle. Preferably, the notification signal is output via the output unit before the output of the warning message. For example, the output unit can be a display or a screen in the interior of the motor vehicle. In particular, the display can be arranged on a center console of the motor vehicle. Alternatively, the output unit can also be an acoustic output unit such as a microphone, for example. By means of the output unit, a driver can be notified visually or acoustically in the interior of the motor vehicle that no radio-based remote control device could be detected in the interior of the motor vehicle. As acoustic or optical notification signal, it is possible to output, for example, the text or lettering "key not found." For example, the radio-based remote control device can be located at a site in the motor vehicle which is not detectable by the detection device. If this is the case, a warning message would be output erroneously. Due to the output of the notification signal, error messages can be reduced. Thereby, the reliability of the anti-theft device is increased.

In order to be able to carry out the inventive method, an anti-theft device for a motor vehicle is provided by the invention. The anti-theft device comprises a detection device which is configured to monitor an interior of the motor vehicle after the motor vehicle has been started. In addition, in order to monitor the interior of the motor vehicle, the detection device is configured to output signal restricted to the interior space in the interior of the motor vehicle. Moreover, the detection device is configured to output a warning message to a unit outside the vehicle only if no detection signal is received after the output of the search signal.

Advantageously, the detection device is set up to send the search signal and/or to receive the detection signal by near-field communication. Near-field communication can also be referred to as near-field communication. Near-field communication is in particular an international transmission standard based on RFID technology for contactless exchange of data by radio technology over a predetermined distance. For example, the detection device can output the search signal to the radio-based remote control device. The radio-based remote control device can be configured to output a detection signal upon reception of the search signal.

The anti-theft device can be implemented in the described manner in a motor vehicle. Accordingly, the invention also provides a motor vehicle with an embodiment of the inventive anti-theft device. The inventive motor vehicle is preferably designed as a car, in particular a passenger car.

The advantages described for the inventive method and preferred embodiments also apply to the inventive motor vehicle and to the inventive anti-theft device and vice versa.

FIG. 1 shows a diagrammatic representation of an exemplary embodiment of an anti-theft device 10 for a motor vehicle 12.

The embodiment example explained below is a preferred embodiment of the invention. In the embodiment example, the described components of the embodiment in each case represent individual features of the invention to be considered independently of one another, which in each case also develop the invention independently of one another and thus should also be considered to be part of the invention, individually or in a combination other than the combination shown. Moreover, the described embodiment can be supplemented by features other than the already described features of the invention.

The motor vehicle 12 preferably has keyless functions. In other words, the motor vehicle 12 can be a keyless vehicle. The motor vehicle 12 can here be unlocked without active use of a radio-based remote control device and can be started by the actuation of a start/stop operating element, in particular of a start/stop button, in an interior of the motor vehicle 12. The radio-based remote control device can be, for example, a radio key of the motor vehicle 12 or a portable mobile terminal in particular a Smartphone. For a user of the motor vehicle 12 to be able to enter the at first parked and locked motor vehicle 12 and start the motor vehicle 12, the radio-based remote control device can be configured to communicate with the motor vehicle 12 by near-field communication. Near-field communication here is a communication between the radio-based remote control device and the motor vehicle in or around a predetermined area or at a predetermined distance from the motor vehicle 12. For example, the radio-based remote control device can communicate with the motor vehicle via Bluetooth or near-field communication or in an HF radio range or LF radio range.

If the user wishes to unlock the motor vehicle 12, then he just has to carry the radio-based remote control device with him and, for example, touch a door handle of the motor vehicle 12. For this purpose, the motor vehicle 12 can have on the door handle, for example, a sensor such as a capacitive sensor, for example, or a contact on the door lock. As soon as it is detected by the sensor that someone has approached the door handle or actuated the door handle, the motor vehicle, in particular a communication unit of the motor vehicle, sends out a query signal to the radio-based remote control device. If the radio-based remote control device is within adequate range, it receives the query signal, decodes it and again sends out a signal with a new coding. In the motor vehicle 12, this signal is decoded again, and, in the case of a successful authentication, an unlocking of the motor vehicle 12 is authorized.

The anti-theft device 10 becomes preferably active as soon as the motor vehicle 12 is started. The anti-theft device 10 for this purpose has a detection device 14. The detection device 14 can preferably be a component of a keyless system of the motor vehicle 12. Here, the detection device 14 of the anti-theft device 10 is configured to monitor the interior of the motor vehicle 12 after the starting of the motor vehicle 12. For this purpose, the detection device 14 in the interior of the motor vehicle 12 outputs a search signal restricted to the interior to the radio-based remote control device. For example, the detection device 14 can be arranged on a ceiling of the motor vehicle 12, in particular via a center console of the motor vehicle 12. The search signal can be restricted to the interior of the motor vehicle 12, for example, by a predetermined signal strength of the search signal or a transmission angle of the search signal.

The radio-based remote control device is set up to receive the search signal.

Furthermore, the radio-based remote control device is set up to output a detection signal when the search signal is received. For the reception of the search signal and the transmission of the detection signal, the radio-based remote control device preferably has a transmitting and receiving unit or near-field communication device. In order for the radio-based remote control device to be able to react at all to the search signal, the radio-based remote control device is preferably located in the interior of the motor vehicle 12.

By the transmission of the search signal, a predetermined search time starts. The predetermined search time can be a predetermined time interval between 5 seconds and 60 seconds. If, after the expiration of the predetermined search time of, for example, 10 seconds, the detection device 14 does not receive a detection signal from the radio-based remote control device, then the detection device 14 sends out a warning message W to a unit 16 outside the vehicle. Outside the vehicle here preferably means that the unit is located outside the motor vehicle, in particular in the vicinity of the motor vehicle.

The unit 16 outside the vehicle can comprise an operations center and/or a service center of a manufacturer of the motor vehicle 12 and/or a portable mobile terminal. Depending on the entity to whom the warning message is sent, different measures can be taken.

The portable mobile terminal can be, for example, the portable mobile terminal of an owner of the motor vehicle 12. For example, the detection device 14 can store a mobile radio number of the portable mobile terminal. The portable mobile terminal can also be, for example, the radio-based remote control device. As soon as no detection signal is received by the detection device 14, the detection device 14 can be configured to send out a text message or a voice message as warning message W to the mobile radio number. Here, the warning message can comprise, for example, a notification concerning an unauthorized movement of the motor vehicle 12. In addition, the warning message W can comprise a position of the motor vehicle 12. The warning message W can be output, for example, in the form of a short message such as an SMS (Short Message Service). By means of the current position of the motor vehicle 12, the owner can determine whether the motor vehicle has been moved without authorization. After reception of the warning message W, the owner can take further measures and, for example, notify the police.

Alternatively or additionally, the unit 16 outside the vehicle can comprise the operations center. As soon as the detection device 14 receives no detection signal from the radio-based remote control device, the detection device 14 can be configured to output the warning message W to the operations center. The operations center can react to the warning message W after the reception of the warning message W. In this way, the operations center, after the reception of the warning message W, can output or send out a control signal S to the motor vehicle 12. For example, the motor vehicle 12 can comprise a control device 18 which is configured to receive the control signal S. By means of the control signal S, a driving operation of the motor vehicle 12 can be controlled. For this purpose, for example, the control device 18 can be configured to control an engine 20 of the motor vehicle 12. By the controlling of the engine 20, for example, the speed of the motor vehicle 12 can be reduced or the motor vehicle 12 can be stopped. Controlling the driving operation thus is preferably understood to mean intervening in or controlling the driving dynamics or the movement of the motor vehicle 12.

In order to ensure that the motor vehicle 12 has not been stopped or operated at an unauthorized site, the control device 18, as soon as it receives the warning message W, can locate the motor vehicle 12 or determine a current position of the motor vehicle 12. The determination of the position of the motor vehicle can occur, for example, by a tracking system, for example, a GPS tracker. Alternatively, the warning message W can also already comprise a current position of the motor vehicle 12.

Alternatively or additionally, the unit 16 outside the motor vehicle can comprise the service center of the manufacturer of the motor vehicle 12. For example, if the detection device 14 does not contain a stored mobile radio number of the portable mobile terminal of the owner of the motor vehicle 12, then the detection device 14 can send out the warning message W to the service center of the manufacturer of the motor vehicle 12. The service center can initiate appropriate measures. For example, the service center can inform the owner of the motor vehicle 12. In addition, the service center can notify the police.

In addition to the transmission of the warning message to the unit 16 outside the vehicle, additionally or alternatively, after reception of the warning message W, the unit 16 outside the vehicle can establish, for example, a unidirectional or bidirectional voice connection with the motor vehicle 12. For this purpose, the motor vehicle 12 can comprise, for example, loudspeakers in the interior. Via the voice connection, the unit 16 outside the vehicle can communicate with the driver or user of the motor vehicle 12. For example, if the warning message W is transmitted to the portable mobile terminal, then the motor vehicle 12 can call, for example, the mobile radio number stored in the detection device and thereby establish a bidirectional voice connection with the portable mobile terminal. For example, if the warning message W is transmitted to the operations center, then a unidirectional or bidirectional voice connection can be set up with the operations center. Via the voice connection, the operations center can output instructions to the driver of the motor vehicle. For example, the operations center can request that the driver stop the motor vehicle 12 as soon as possible.

BRIEF DESCRIPTION OF THE DRAWING

Overall, the invention describes a method for the interactive stopping of a motor vehicle due to the absence of a radio-based remote control device or of a key in an interior of the motor vehicle.

DETAILED DESCRIPTION

If, by means of the keyless function, during the driving operation, no valid vehicle key is recognized in the vehicle interior, a warning notice is output in the vehicle. The output of the warning notice can occur by means of an output unit such as a display in the interior of the vehicle. After the output of the warning notice by means of the output unit in the vehicle interior (key not found) and after repeated key searches have taken place (so-called retries), then, after an adjustable time, corresponding information is sent via a communication system incorporated in a fixed manner in the vehicle, such as, for example, a connect service. Here, mobile radio numbers taught to the motor vehicle can be dialed and also the service center of the manufacturer can be informed. In case of suspected theft, a stopping of the motor vehicle can occur thereupon via mechanisms incorporated or implemented separately in the vehicle electronics unit.

The invention claimed is:

1. A method for operating an anti-theft device for a motor vehicle which is unlocked when a radio signal is received from a radio-based remote control device of the motor vehicle and, after unlocking, is started by actuating a start/stop operating element, comprising:
    monitoring of an interior of the motor vehicle by a detection device of the anti-theft device after the motor vehicle has been started, wherein for the monitoring of the interior of the motor vehicle, the detection device outputs a search signal restricted to the interior in the interior of the motor vehicle, wherein the radio-based remote control device outputs a detection signal when the search signal is received,
    if the detection signal is not received by the detection device before a predetermined search time,
    transmission of a warning message to a unit outside the vehicle, wherein the unit outside the vehicle includes a service center of a manufacturer of the motor vehicle or an operations center, to which the detection device outputs the warning message, wherein after the reception of the warning message, a unidirectional or bidirectional voice connection is set up between the unit outside the vehicle and the motor vehicle, and
    after the reception of the warning message, the unit outside the vehicle outputs a control signal to the motor vehicle, wherein a driving operation of the started motor vehicle is controlled by means of the control signal, wherein after the reception of the warning message, the unit outside the vehicle additionally detects a position of the motor vehicle and outputs the control signal as a function of the position of the motor vehicle.

2. The method according to claim 1, wherein the detection device outputs the warning message to a mobile radio number of a portable mobile terminal, which is stored in the detection device.

3. The method according to claim 1, wherein in addition to the output of the warning message to the unit outside the vehicle, a notification signal is output via an output unit which is arranged in the interior of the motor vehicle.

4. An anti-theft device for a motor vehicle, comprising:
a detection device which monitors an interior of the motor vehicle after the motor vehicle has been started, wherein, for monitoring the interior of the motor vehicle, the detection device outputs a search signal which is restricted to the interior of the motor vehicle, wherein the detection device outputs a warning message to a unit outside the vehicle only if there is no reception of a detection signal after the output of the search signal, wherein
the unit outside the vehicle includes a service center of a manufacturer of the motor vehicle or an operations center, to which the detection device outputs the warning message, wherein
the unit outside the vehicle sets up a unidirectional or bidirectional voice connection between the unit outside the vehicle and the motor vehicle after the reception of the warning message, wherein
the unit outside the vehicle further outputs a control signal to the motor vehicle after the reception of the warning message, wherein a driving operation of the started motor vehicle can be controlled by the control signal, wherein
the unit outside the vehicle further detects a position of the motor vehicle after the reception of the warning message and outputs the control signal as a function of the position of the motor vehicle.

5. The anti-theft device according to claim 4, wherein the detection device is configured to transmit the search signal and/or to receive the detection signal by near-field communication.

6. A motor vehicle with an anti-theft device according to claim 4.

* * * * *